July 26, 1960

R. HENSLEY 2,946,580

AUTOMATIC WEIGHT LOADER

Filed Dec. 1, 1958

*INVENTOR.*
RAYMOND HENSLEY

BY
Charles F. Dieckler

ATTORNEY

July 26, 1960   R. HENSLEY   2,946,580
AUTOMATIC WEIGHT LOADER
Filed Dec. 1, 1958   4 Sheets-Sheet 3

INVENTOR.
RAYMOND HENSLEY
BY
Charles F. Dieckler
ATTORNEY

July 26, 1960

R. HENSLEY 2,946,580

AUTOMATIC WEIGHT LOADER

Filed Dec. 1, 1958

INVENTOR.
RAYMOND HENSLEY

BY
*Charles F. Dischler*

ATTORNEY

United States Patent Office 2,946,580
Patented July 26, 1960

2,946,580
AUTOMATIC WEIGHT LOADER

Raymond Hensley, Los Angeles, Calif., assignor to North American Aviation, Inc.

Filed Dec. 1, 1958, Ser. No. 777,395

8 Claims. (Cl. 265—48)

This invention relates to the placement and withdrawal of weights into and out of operative association with some lever or linkage in the weighing mechanism of a scale or force measuring apparatus. Such lever may form part of a loading or tare beam portion of the force measuring apparatus. Selectively placeable and withdrawable unit weights are useful in conjunction with an ordinary weighing scale for adding to the normal weighing capacity of such scales. Such selective placement and withdrawal of unit weights also finds use in the calibration of complex balance systems such as are utilized for force measurement in wind tunnel systems and the like.

Accordingly, it is an object of this invention to provide an automatic weight loader of unique design that is operable for increasing the capacity of a weighing scale above its normal capacity or which may be utilized for the calibration of a force measuring system, such as is used for wind tunnel measurements.

It is also an object of this invention to provide a simple and compact counterpoise means for transferring weights from a static position at rest and successively adding them to the force system loading beam in order to permit calibration thereof or to counterbalance an increased load thereon.

Another object is to provide a compact weight-loader, wherein the mechanism for individually and sequentially suspending each unit weight is located interiorly of the individual weights.

A further object is to provide a mechanism for successively applying one or more of the unit weights as desired beginning with the top weight of a plurality of such stacked weights and for unloading such weights in a reverse manner beginning with the bottommost weight and progressively unloading the next preceding uppermost weight. Such sequential loading and unloading is achieved by means of a rotating shaft driven by a power means that may be started, stopped and reversed at will to achieve any desired loading combination of weights.

The present inveniton comprises a plurality of stacked unit weights concentric about a rotatably driven shaft member, having threaded portions spaced therealong, which is suspended from the loading beam. Rotation of the driven member causes auxiliary threaded means to successively coact with the threaded shaft portions to successively engage and raise one or more of the weights from a static position on a suitable base whereby such weight or weights will be suspended from the loading beam. Rotation of the driven shaft member in a reverse direction successively lowers the unit weights back onto the base beginning with the last one raised.

These and other objects and advantages of the present invention will become apparent to those skilled in the art after reading the present specification and the accompanying drawings forming a part thereof, in which.

Figures 1, 4:
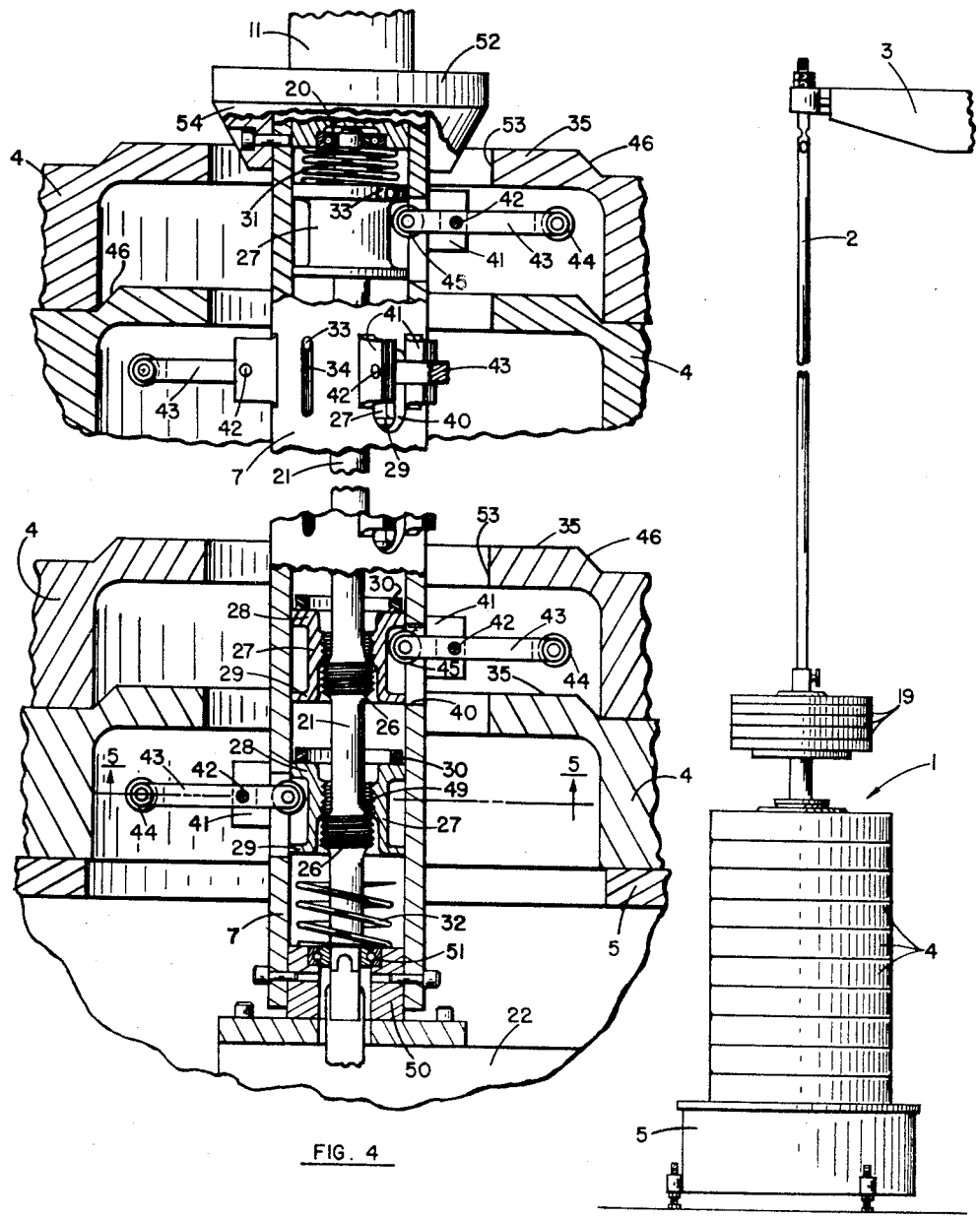
Fig. 1 is an elevational view of the weight-loader of this invention utilized in conjunction with the loading beam of a force measuring system.
Fig. 4 is a fragmentary axial sectional view of the weight-loader, wherein all of the weights are in a "down position," i.e., removed from suspension from the loading beam and resting upon a base member.

Referring specifically to the drawings, wherein like reference characters have been used throughout the several views to designate like parts and referring at first to Fig. 1, reference numeral 1 generally designates the automatically operable weight-loader of this invention connected through a suspension rod 2 to the loading or tare beam 3 of a force or weight balancing system.

Figure 2:
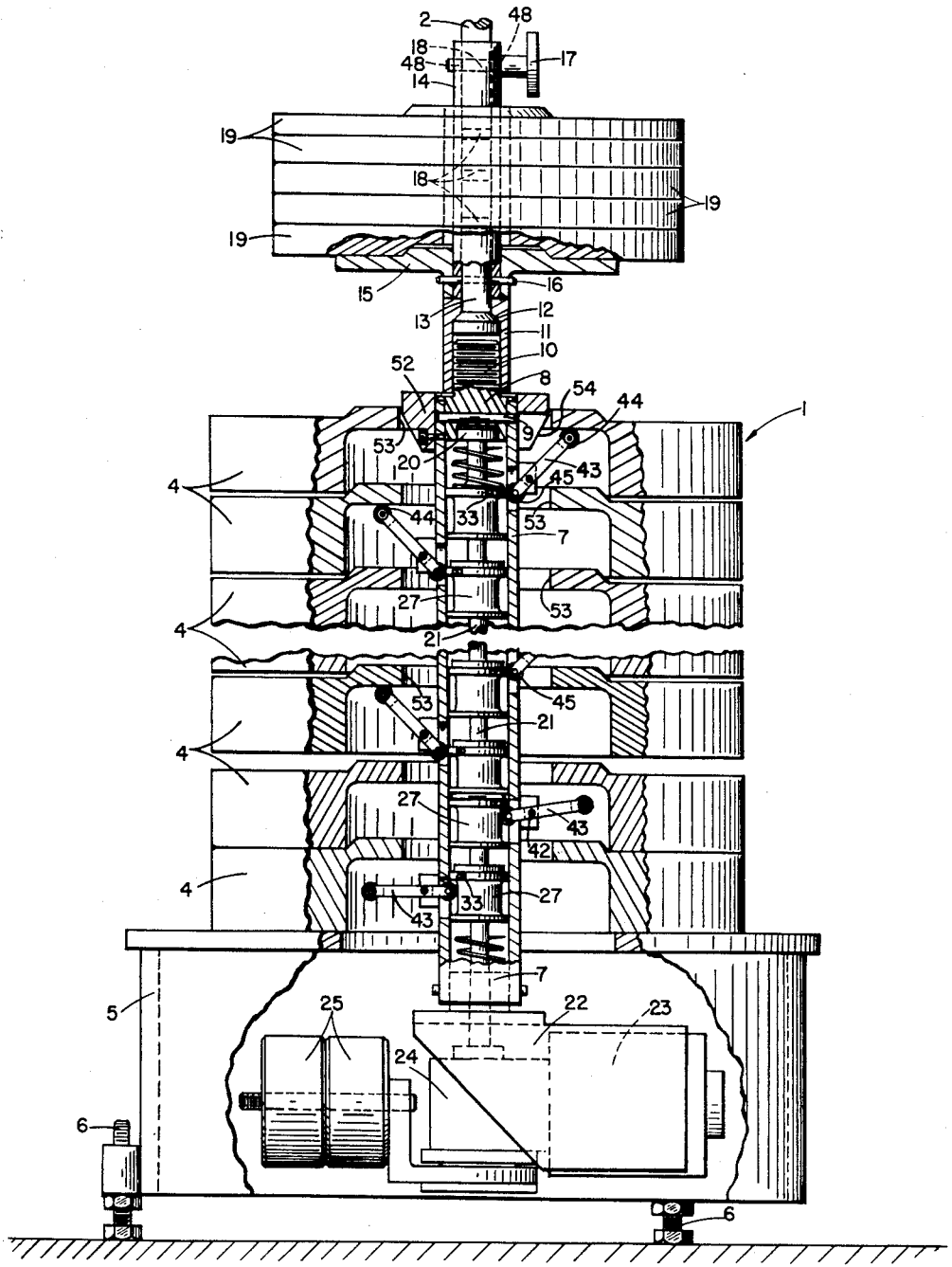
Fig. 2 is a side elevational view, partly in section, of the weight-loader of the present invention.

Referring now to Fig. 2, the construction and operating features of the apparatus will be explained in detail. A series of weights 4 are normally positioned at rest upon a base 5 supported and leveled with respect to a plane surface by means of leveling screws 6. As shown in Fig. 2, all but the lower two weights have been raised from an inoperative, static position on the base and have been suspended from the mechanism with the full gravitational effect of such weights being transmitted to suspension rod 2 and thereby to the loading beam 3.

The mechanism, whereby the weights may be actuated and raised from an at-rest position to a loaded position, comprises a tubular member 7 having its upper end closed by an upper end bearing block 8 which is connected thereto by dowel pin 9. A substantially similar end bearing block 50 is located at the lower end of member 7. An upstanding threaded portion 10 of the upper end block is threadedly engaged by a nut 11 having an internal shoulder 12 for engagement with the enlarged lower end of a plug 13. Plug 13, collar 14 and a depending flange of load pan 15 are all pin-connected together by means of a dowel 16 to form a composite rigid structure. The lower end of rod 2 has a series of diametral bores 18 therethrough matching a pair of apertures 48 formed in the walls of collar 14 for the reception of a T-handle ball detent pin 17, whereby the length of rod 2 may be adjusted to suitably connect the weight loader to the loading beam with the final adjustment being made by means of leveling screws 6. For adjusting to an initial load condition, weight 19 may be placed on load pan 15.

Shaft 21 is axially mounted for rotation within tubular member 7 by end bearing 20 positioned in end bearing block 8 at its upper end and by a similar bearing 51 in end bearing block 50 at its lower end. In the present embodiment the shaft drive means is suspended from the lower end of member 7 by means of a bracket 22 which carries the motor 23 and gear box 24, as well as counterweights 25 which provide symmetrical loading of the drive mechanism. Counterweights 25 are preferably mounted with some degree of pivotal freedom about the axis of shaft 21 to allow for swinging adjustment relative to the motor for accurate counterbalancing.

Figure 3:
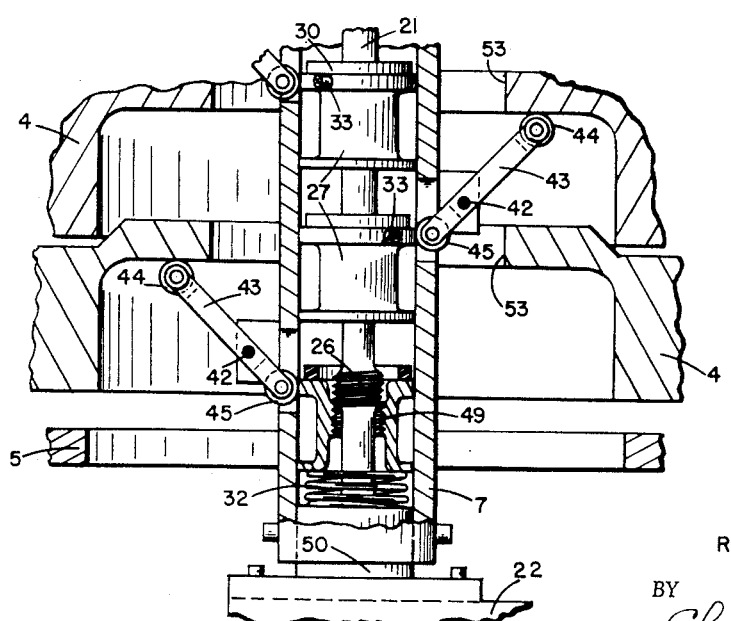
Fig. 3 is an enlarged axial sectional view of a fragmentary portion of the weight-loader, wherein all of the weights are in a raised, suspended position.
Figure 6:
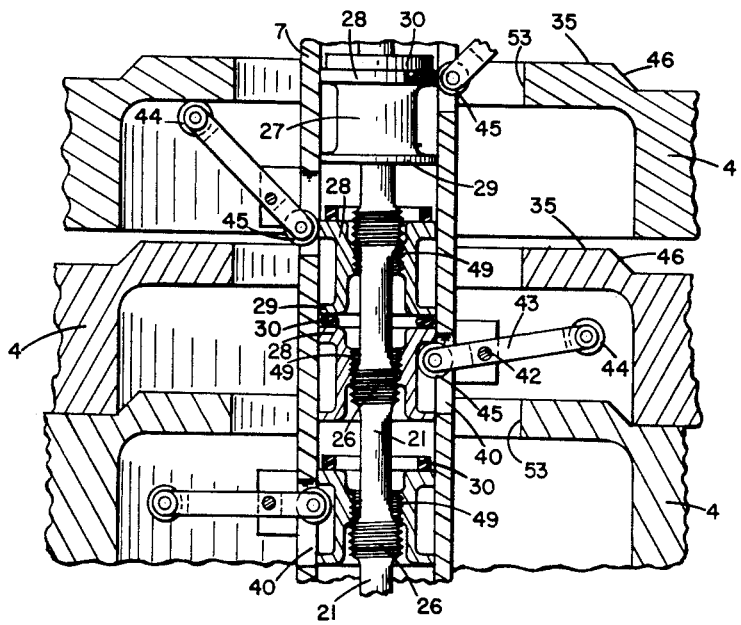
Fig. 6 is an axial sectional view of a portion of the weight loader illustrating the relationship of the threaded portions of the device and the lever systems whereby sequential axial movement of the weights is obtained.

Referring to Fig. 4, it will be seen that shaft 21 has axially spaced threaded portions 26 extending along its length. A plurality of collars or nuts 27, each of which has a threaded portion 49 intermediate its ends for engagement with one of the shaft threaded portions 26, is positioned along the shaft in proximity to the shaft threaded portions. Each such collar has an upper flange 28 and a lower flange 29 for sliding contact with the inner bore of tubular member 7. In their at-rest position, with the weights supported from the base and not suspended from rod 2, the collars are positioned as shown in Fig. 4 with the threaded portions above and out of engagement with their associated shaft threaded portions 26 and the levers 43 are positioned substantially horizontally with their inner ends lying within the annular space formed around each collar between the top and bottom flanges thereof. Resilient O-rings 30 are suitably attached to the upper face of flange 28 of each of the collars with the exception of the uppermost one. A spring 31 is mounted within tubular member 7 at its upper end in a manner to bear against the upper face of the topmost collar 27 and exert a biasing force downward when the collars are in a static position above the threaded shaft portions as shown in Fig. 4, i.e., when the weights are in an unloaded position. A similar spring 32 is positioned within the lower end of tubular member 7 to provide a similar biasing force in an upward direction against the lower face of flange 29 of the bottommost collar when the collars have been driven to the lowermost extent of their travel and the threaded portions 49 thereof are below threaded shaft portions 26, as shown in Fig. 3. The latter conditions, respectively, exist only when all of the weights are in an at-rest condition or have been raised into a loaded position whereby they are suspended from the loading beam by means of the tubular member 7 assembly. With the weights 4 at rest upon base 5 and the collars 27 positioned along the shaft, each above its coacting shaft threaded portion 26, spring 31 biases the uppermost collar into engagement with its coacting shaft threaded portion upon rotation of shaft 21 by operation of the motor in the proper direction. Pins 33, attached to the upper flange of each of the collars, slide in longitudinally extending slots 34 formed in the wall of tubular member 7, whereby, upon rotation of the shaft and coaction of the threaded collar and shaft portions, the collar is translated downwardly until the collar threaded portion is driven out of engagement with the shaft threaded portion and is positioned below but in juxtaposition to such shaft threaded portion, as best shown in Fig. 6. Preferably each collar has three equiangularly spaced pins 33 for sliding movement in three complementary equiangularly spaced slots 34 in the tubular member. The assembly is so dimensioned that the downwardly moving collar still has several threads in engagement with the shaft threaded portion when the lower face of its lower flange 29 contacts the O-ring 30 on the upper surface of the collar next below. O-rings 30 prevent metal-to-metal contact of the adjacent collar faces and provide a resilient cushion therebetween. This is necessary to prevent stripping the threads on the collar and shaft since the collars are prevented from turning by pins 33. By using three such pins 33, the collars may be initially positioned upon installation so that the O-rings will not be compressed any more than one-third of the thread pitch before the collar associated therewith will threadedly engage the shaft threads and commence to be driven axially. Before the upper collar is driven out of threaded engagement with the shaft, the next lowermost collar threaded portion 49 has been driven into engagement with its shaft threaded portion. By such successive action, each of the collars is sequentially driven downwardly by continued rotation of the shaft in the same direction, beginning with the uppermost collar and ending with the lowermost collar.

In the region adjacent each of the threaded shaft and collar portions, equally-spaced longitudinally extending slots 40 are formed in the wall of tubular member 7, with lugs 41 on either side of each slot extending radially outwardly therefrom for reception of a pivot pin 42. A lever 43 is pivotally mounted on each pin 42, with rollers 44 and 45 mounted on the outer and inner ends, respectively, of the lever arm. With the weights 4 at rest the inner end of lever 43 is positioned between the collar flanges, and as each collar is translated downwardly, upper flange 28 contacts inner roller 45 and forces it downwardly rotating lever 43 to move outer roller 44 upwardly into contact with the undersurface of the annular shoulder 35 of the weight. Continued downward movement of the collar causes continued rotation of the lever 43 and thereby raises the weight contacted by roller 44 from the upper surface of the next adjacent lower weight. When this weight is lifted in this manner, the full gravitational effect of the weight is transmitted through lever 43 to tubular member 7 and the suspension rod 2. The position of the levers and collars with the weights in a raised position is shown clearly in Figs. 2, 3 and 6.

Figure 5:
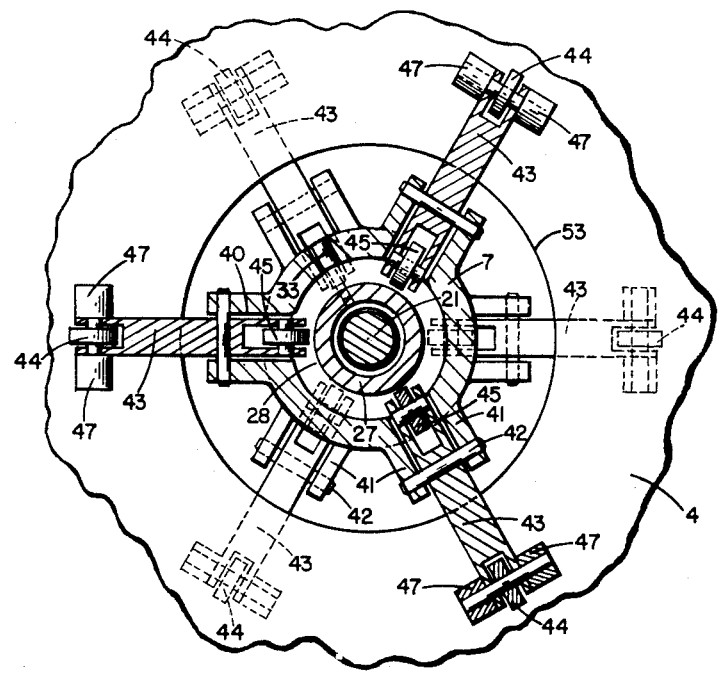
Fig. 5 is a fragmentary transverse cross-sectional view taken in the place of the lines 5—5 of Fig. 4 illustrating in detail the essential axial weight-moving mechanism.

To insure symmetric, non-eccentric loading of the assembly, a plurality of levers 43 should be provided for the lifting of each weight, with such levers being equiangularly spaced around the circumference of tubular member 7. As shown in Fig. 5, three such levers are provided for optimal three point suspension of each weight, with the lever systems for alternate weights being angularly offset from that of the adjacent lever arrangement in order to prevent undue weakening of tubular member 7 and for convenience of arrangement.

Turning to the fragmentary view of Fig. 6, an intermediate driving position of the coacting threaded assembly is illustrated. As shown therein, the upper weight 4 has been lifted from the next lowermost weight and suspended from rod 2. It will be observed that in this position of the lever 43, inner roller 45 bears against the outer peripheral edge of flange 28 and under the action of the gravitational force applied to the lever by the weight 4, an inwardly directed radial force is applied to the edge of the flange. With such force applied at a number of points on the flange edge by a series of equiangularly spaced individual levers, the collar will be held in equilibrium after the weight has been raised and the collar is disengaged from the shaft threaded portion. In this fashion each collar is prevented from dropping downwardly but is maintained in its proper position just below its associated shaft threaded portion. Counterweights 47 on the outer end of levers 43 tend to raise the inner ends of the levers and thus assist in biasing the collars upwardly. In this position each individual collar may be moved upwardly into threaded engagement with the shaft as the next lowermost collar nears the end of its upward travel and the resilient member 30 on its upper surface contacts the lower face of flange 29 of the upper collar. It should be observed that if the loader is stopped in an intermediate position, i.e., with some of the weights loaded and some unloaded, the shaft threaded portions and the collars are dimensioned so that at least one of the collars has one or more threads engaged with the shaft threads. By this arrangement, shaft 21 may be stopped at any position of the weights and then may be started and driven either in the same or a reverse direction, with positive movement of the collars being effected by the threaded drive engagement.

With all of the collars driven to their lowermost positions, wherein the collar threaded portions are disengaged from and below the shaft threaded portions and consequently with all of the weights in a raised position, spring 32 is compressed to bias the lowermost collar in an upward direction, as shown in Fig. 3. Upon reversal of the drive motor, shaft 21 is rotated in an opposite direction in a manner, whereby, upon coaction of shaft threaded portion 26 with the collar threaded portion 49, the collars are translated upwardly successively in a reverse fashion to that outlined previously for raising of the weights. As each individual collar is raised, the levers associated therewith are lowered into a horizontal position and the weight carried thereby is similarly lowered until the lowermost such weight comes to rest on base 5. Continued rotation of shaft 21 places the resilient O-ring 30 of the lowermost collar in contact with the lower face of flange 29 of the second lowermost collar and biases that collar into engagement with the second lowermost shaft threaded portion 26 to repeat the process of moving that collar upwardly and lowering its associated weight. Thus, continued rotation of the shaft in this given direction will raise all of the collars and lower all of the weights successively beginning with the lowermost such weight.

By controlling the drive motor to stop and start the rotation of the shaft any desired number of collars may be moved downwardly or upwardly as desired. In this fashion, by proper control of the drive motor 23, as many weights may be added to or removed from the balance system loading beam as are required.

Prior art weight loading devices, particularly manually loaded or operated structures, have always been subject to serious vibration damping problems. In the present invention, resilient members 30, positioned to prevent metal-to-metal contact between the collar members, provide a high degree of damping permitting a smooth positive driving action of the loader unit with a minimum of vibration. To assist in damping any vibration that may have been induced by the lifting action, an annular member 52, having a lower frustoconical guide portion 54 depending therefrom, is attached around the upper end of tubular member 7. The outer peripheral surface of member 52 has a diameter closely conforming to and only slightly less than the inner diameter of the central apertures 53 of the weights. When the upper weight 4 is raised, it is guided by frustoconical portion 54 so that it slides over at least a portion of the outer surface of member 52, in close proximity thereto, whereby the weight is centered and any swinging or vibration of the weight is quickly damped out. As each successive weight is raised, it is brought into close proximity to, but not touching, the next uppermost weight whereby any vibrations will be damped progressively upwardly through the system.

For the purpose of nesting the individual weights in their inoperative position, the outer edge of the raised annular shoulder 35 of each weight is beveled to form a frustoconical surface 46 which serves to index and center the weights.

Figure 8:
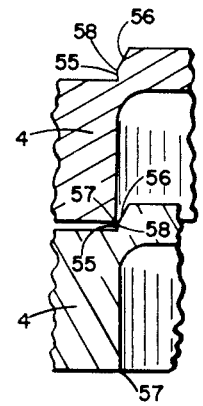
Fig. 8 illustrates a preferred form of the loading weights for maintaining the weights in concentric relation to the central tubular member and for achieving maximum of the weights.
Figure 7:
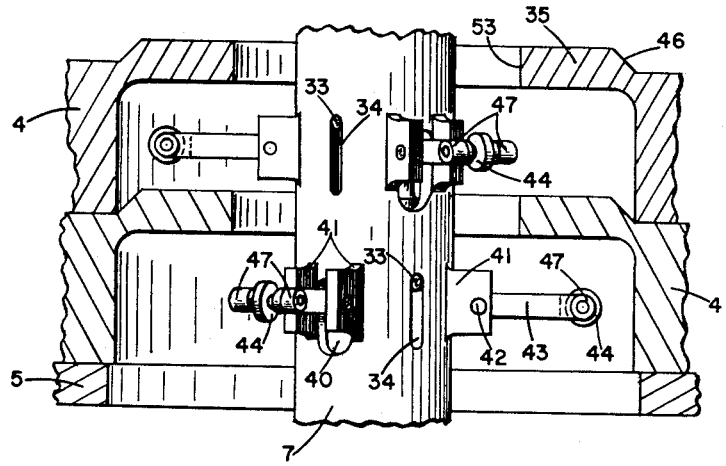
Fig. 7 is a fragmentary axial sectional view of the weight loader showing the central tubular member and associated lever assemblies in elevation.

Fig. 8 illustrates a preferred design of the weights for achieving maximum damping thereof and for maintaining them in vertical alignment concentric with central tubular member 7 when the weights are in a raised position. In this embodiment a short axial cylindrical surface 55, having an axial length approximately equal to or slightly less than the vertical distance that the weights are separated when in a raised position, is formed around the base of the raised annular shoulder 35 with a bevel 56 proceeding upwardly therefrom. When the weights are in their raised position, the lower inner edge 57 of each weight is then in close proximity to the edge 58, formed by the annular intersection of the cylindrical surface 55 and frusto-conical surface 56, of the next lowermost raised weight, and swinging and vibratory motion therebetween is thus damped out.

From this description it will be seen that the weights are raised through only a short vertical distance and the problem of damping the weights, which has heretofore existed, is virtually eliminated. Furthermore, by incorporating the drive system in the hollow space within the annular weights, an extremely compact unit is obtained.

In some arrangements it may be desirable to include a fluid dashpot for preventing oscillation of the overall suspended loader device. This may readily be accomplished by installing a suitable vane, fin or like member to depend below the power drive assembly and extend into a reservoir or dashpot containing a high viscosity fluid, such as a heavy oil or a grease.

One application wherein the weight loader of the present invention has been employed with particular success is in the calibration of a sting mounted balance system. Such a balance system utilizes strain gauges for the measurement of the aerodynamic loads acting on a model, mounted by the sting in a high speed wind tunnel.

While a particular embodiment of this invention has been illustrated and described herein, it will be apparent that various changes and modifications may be made in the construction and arrangement of the various parts without departing from the spirit and scope of this invention in its broader aspects, or as defined in the following claims.

I claim:

1. A weight-loading device adapted for use with the loading beam of a force measuring system comprising a vertical shaft carried by said beam; means for rotating said shaft, said shaft having axially spaced threaded portions; a nut on said shaft adjacent each of said threaded portions; means operatively associated with each of said nuts for contacting the next adjacent nut and individually and sequentially advancing each of said nuts beginning from one end of the shaft onto its adjacent threaded shaft portion for coaction therewith upon rotation of said shaft and consequent movement of said nuts along said shaft; a plurality of weights adapted to be contacted and suspended by a weight raising means; and a weight raising means adapted to contact said weights and to be contacted by said nuts, said weight raising means being operable by the sequential movement of each of said nuts upon movement thereof in one direction along the shaft for sequentially and individually raising the weights and thereby applying the same to said loading beam and for sequentially and individually lowering said weights out of suspension upon reverse rotation of said shaft and movement of said nuts in an opposite direction along the shaft.

2. A weight-loading device adapted for suspension from the loading beam of a force measuring apparatus comprising a plurality of apertured weights; a tubular member having slots therein suspended from said loading beam within said apertured weights; a drive shaft rotatably supported within said tubular member; means operatively connected to said drive shaft for rotating the same; a plurality of collar means on said shaft; means operatively associated with each of said collar means for effecting sequential vertical movement of said collar means along said shaft upon rotation thereof; and a weight raising means adapted to contact said weights and to be contacted by said means for effecting movement of said collar means, said weight raising means being operable by the sequential movement of each of said nuts upon movement thereof in one direction along the shaft for sequentially and individually raising the weights and thereby applying the same to said loading beam and for sequentially and individually lowering said weights out of suspension upon reverse rotation of said shaft and movement of said nuts in an opposite direction along the shaft.

3. A weight-loading device adapted for suspension from the loading beam of a force measuring apparatus comprising a plurality of apertured weights; a tubular member having slots therein suspended from said loading beam within said apertured weights; a drive shaft rotatably supported within said tubular member; means operatively connected to said drive shaft for rotating the same; a plurality of collar means on said shaft; means operatively associated with each of said collar means for effecting sequential vertical movement of said collar means along said shaft upon rotation thereof; a plurality of lever means pivotally attached to said tubular member, each of said lever means having one end thereof in contact with one of said weights and the other end in operative contact with one of said collar means whereby such lever means will be pivoted by movement of said collar means in one direction to raise one of said weights and will be pivoted by movement of said collar means in another direction to lower said one weight whereby said weights may be individually sequentially suspended or removed from the force measuring system loading beam.

4. A weight-loading device adapted for suspension from the loading beam of a force measuring apparatus comprising a plurality of vertically-stacked, centrally apertured weights; a tubular member having slots therein suspended from the loading beam coaxially within said apertured weights; a drive shaft having axially spaced threaded portions rotatably supported within said tubular member; means operatively connected to said drive shaft for rotating the same; threaded collar means on said shaft for engagement with the shaft threaded portions; means on said collar means cooperating with the slots in said tubular member restraining said collar means against rotational movement whereby said collar means are translated along the shaft upon rotation of the same; lever means pivotally mounted on said tubular member and extending through the slots therein, each of said lever means contacting one of the weights at one end and the collar means at its other end whereby pivotation of the lever is effected by downward movement of the individual collar means on the shaft to thereby raise one of said weights and suspend the same from the loading beam and whereby reverse pivotal lever movement is attained and such weight is removed from the loading beam by movement of the collar means along the shaft in a reverse direction.

5. A weight-loading device adapted for suspension from the loading beam of a force measuring apparatus comprising a tubular member having slots therein suspended from the loading beam; a drive shaft having axially displaced threaded portions therealong rotatably supported within said tubular member; means attached to said tubular member for rotating said drive shaft; a collar on said shaft adjacent each of said threaded portions; each of said collars having a threaded portion intermediate its ends and being of a predetermined length such that adjacent collars will successively come into contact upon continued rotation of the shaft; spring means operatively contacting at least one of said collars for biasing said collars into such operative contact; means on said collars cooperating with the slots in said tubular member for preventing rotational movement of said collar means whereby the latter are translated vertically on said shaft upon coaction of the rotating threaded portions of said shaft and the threaded portions of said collars; a plurality of vertically-stacked weights surrounding said tubular member; a plurality of levers pivotally mounted on said tubular member and extending through said slots, each of said levers being in juxtaposition to a shaft threaded portion and having one end thereof adapted to be raised into contact with one of said weights and the other end in operative contact with one of said collar means whereby at least one of said levers will be pivoted by downward movement of at least one such collar means to thereby raise at least one of said weights and suspend the same from the loading beam and whereby said lever may be pivoted in a reverse direction to lower at least one of said weights upon upward movement of said one collar.

6. A weight-loading device adapted for suspension from the loading beam of a force measuring apparatus comprising a tubular member having slots therein suspended from the loading beam; a drive shaft having axially displaced threaded portions therealong rotatably supported within said tubular member; means attached to said tubular member for rotating said drive shaft; collar members having a threaded portion positioned along said shaft with each said collar member adapted for engagement with one of said shaft threaded portions upon rotation of the shaft, said collar members having portions adapted to contact the next succeeding collar member upon achieving a predetermined travel along the shaft and urge the threaded portion of the next successive collar into engagement with its coacting shaft threaded portion; resilient means operatively contacting the end collars for biasing the end collars into initial operative engagement with their associated shaft threaded portions; a plurality of vertically-stacked weights concentric about said tubular member; pins on said collars positioned for sliding movement in some of said tubular member slots whereby the rotational movement of said shaft is translated into vertical linear movement of said collars relative to the shaft; and a plurality of levers pivotally mounted on said tubular member and extending through others of said tubular member slots, each of said levers having its outer end adapted to be raised into contact with one of said weights whereby said weight may be raised and suspended from the loading beam and having its inner end in operative contact with one of said collars to be rotated thereby upon vertical movement of said collar whereby said weights may be raised or lowered by downward and upward movement of the collar along the shaft.

7. A weight-loading device adapted for use with the loading beam of a force measuring apparatus comprising a plurality of apertured weights adapted for suspension from the loading beam of the force measuring apparatus; means positioned interiorly of said weights and suspended from the loading beam for sequentially applying said weights to the loading beam and for sequentially removing said applied weights from the loading beam, said means comprising a rotatable axial member, and a camming means operatively contacting said axial member and each of said weights for individually raising the weights from the base in sequence upon rotation of the axial member in one direction whereby the weights are suspended from the loading beam and for lowering and removing said weights from suspension on the loading beam upon rotation of the axial member in an opposite direction, and reversible means operatively connected to said rotatable axial member for driving said rotatable axial member whereby said weights may be suspended and removed from suspension on said loading beam.

8. A weight-loading device adapted for suspension from the loading beam of a force measuring apparatus comprising a vertical shaft carried by said beam; means for rotating said shaft; a plurality of collar means movable along said shaft; coacting threaded means on said shaft and said collar means for individually and successively moving said collars up and down said shaft upon rotation of the shaft in first one direction and then the reverse direction; a plurality of vertically-stacked weights concentrically surrounding said vertical shaft and normally disconnected therefrom; and means adapted to contact said weights and to be contacted by said collars, said means being operable by the individual and successive downward movement of said collars upon said shaft to individually and successively raise said weights and operable to individually and successively lower said weights upon upward movement of said collars upon the shaft.

References Cited in the file of this patent

UNITED STATES PATENTS

| | | |
|---|---|---|
| 1,180,892 | Velter | Apr. 25, 1916 |
| 2,864,605 | Thorsson et al. | Dec. 16, 1958 |